United States Patent [19]

Kitaue

[11] Patent Number: 4,865,278
[45] Date of Patent: Sep. 12, 1989

[54] CONTROL COMMAND SYSTEM FOR RAILWAY VEHICLES

[75] Inventor: Masaaki Kitaue, Kobe, Japan

[73] Assignee: Nippon Air Brake Co., Ltd., Kobe, Japan

[21] Appl. No.: 169,655

[22] Filed: Mar. 18, 1988

[30] Foreign Application Priority Data

Mar. 23, 1987 [JP] Japan .................................. 62-68460

[51] Int. Cl.$^4$ .............................................. B61L 3/00
[52] U.S. Cl. ............................ 246/182 A; 246/169 R; 246/183
[58] Field of Search ............... 246/183, 169 R, 182 R, 246/182 A; 303/101, 102, 9; 340/47, 78

[56] References Cited

U.S. PATENT DOCUMENTS 4,161,717 7/1779 Hoover et al. .................. 246/182 C
4,631,514 12/1986 Fujiwara ......................... 246/182 A
4,709,223 11/1987 Crapanzano ....................... 303/102

FOREIGN PATENT DOCUMENTS 0034854 9/1981 European Pat. Off. .............. 340/47

OTHER PUBLICATIONS

Science of the Electric Train, vol. 35, No. 4, Apr. 1, 1982, by the Electric Train Study Group K.K., pp. 45–54.

Primary Examiner—Andres Kashnikow
Assistant Examiner—Christopher G. Trainor
Attorney, Agent, or Firm—J. B. Sotak

[57] ABSTRACT

A brake and/or propulsion command arrangement for railway vehicles, especially for abnormality detection of a dual brake system having a cam controller for producing ON-OFF control signals.

The abnormal detection system employs a comparing circuit for comparing the control signals, an interlocking circuit for producing a verification signal of the position of the cam controlling, and evaluating circuit for producing a trouble detection signal when the control signals are unmatched and during the presence of the verification signal.

6 Claims, 2 Drawing Sheets

CONTROL COMMAND SYSTEM FOR RAILWAY VEHICLES

FIELD OF THE INVENTION

This invention relates to a control command system for use in railway vehicles for producing brake command or start command signals in digital form for a multiplex system when an operating handle is moved to certain selected positions, and more particularly to a control command system for railway vehicles having a comparator for detecting that a pair of multiplex command signals are matched, an interlock producing a verification signal at certain handle positions except when the command signals are being switched manually, and an evaluator which produces a trouble detection signal when both an unmatched detect signal from the comparator and the verification signal from the interlock appear in the control command system.

BACKGROUND OF THE INVENTION

At the present time, there are a number of different types of command systems which normally employ simplex systems. However, in order to improve reliability of the command system, it is highly advantageous to utilize a multiplex system, namely, a duplex system.

One example of a brake command system having a multiplex system is described on pages 45–54 of *Science of the Electric Train*, Vol. 35, No. 4, dated Apr. 1, 1982, by the Electric Train Study Group K.K. This system is shown in FIG. 25 on page 47 of the above publication and this system is reproduced and is shown in FIG. 2 of the subject application which will be explained hereinafter. As shown in FIG. 2, the characters C61–C65, C71, C72, C81, C82, C91, and C92 represent rotating drum controller cam plates linked and operated by a suitable handle (not shown) by the trainman or engineer. The characters S61–S65, S71, S72, S81, S82, S91 and S92 represent cam switches which make or break contact with the above-mentioned cam plates. The number 0 represents the release REL position, while the numbers 1–7 represent the selected normal brake positions. The symbol emerg. is the emergency brake position. The characters SB1–SB3 are the pole connecting lines for the normal brake. The symbol UB is the pole connecting line for the security brake. The symbol EB (+) is the pole connecting line for the positive emergency brake power supply, and the symbol EB (−) is the pole connecting line for the negative emergency brake. In addition, the cross-hatched area on the left side of each cam plate indicates the range in which each corresponding cam switch is ON. It will be appreciated that FIG. 2 shows the state in which the handle (not shown) is at a position in which all cam switches are OFF.

When the handle is operated to the release position and then to the normal brake position, such a position 2 (notch), the cam switches S64 and S65 are OFF, and the normal brake command (1,0,1) is conveyed to the connecting line SB1, SB2, and SB3. In the same way, when the handle is operated at another position, each corresponding cam switch is ON or OFF and each brake command is different.

FIG. 2 shows one example of the existing brake command system in which the brake operating device (not shown) which connects to the pole connecting line is usually energized, and the security brake command system and the emergency brake command system are duplex systems, and each of the corresponding cam switches are connected in parallel. Although the explanation of the figure is omitted, a brake command system in which the normal brake command system is a multiplex system, and a start command system in which the start command system is a multiplex system exists.

OBJECTS AND SUMMARY OF THE INVENTION

In the subject command system, the brake command or the start command is a multiplex system having digital signals in which one of the switches in a system always remains ON and does not turn OFF. In such a connecting operating system, the brake operating system moves into a release maintaining state or a brake maintaining state so that the train crew will be alerted. However, in the reverse situation, when a switch in the system remains OFF and does not turn ON, if the switch in the other system is normal, the operating system which is connected to this operates normally, and the problem with the switch will not appear. Generally, in a digital signal multiplex system, signals in each channel are compared to see if they match or not, and if they do not match, it is normally considered a problem.

However, when several digital signals are ON or OFF at the same time, a lag occurs in the timing period because of manufacturing shortcomings in the switch or an assembly defect in the command system, so that, in this lag range, even if there is not a problem, it sometimes causes a false trouble signal to be detected.

In the present invention, there is provided a unique technique for solving the above-mentioned problem by employing a comparator which detects whether each multiplex system command signal matches or not. An interlock produces a verification signal at certain handle positions with exception when each command is switched manually. An evaluator produces a trouble detecting signal when the no-match detect signal from the comparator and the verification signal from the interlock are both produced in a railroad car command system so that a brake command or start command is generated at certain handle positions. It will be appreciated that the commands are digital signals in the subject multiplex system.

In this unique technical method of controlling railway vehicles in which a comparator continuously compares each of the multiplex system commands, and if they don't match, it generates a no-match detect signal. However, the interlock will not produce the verification signal when a command is switched by operating the handle. Accordingly, the evaluator will not produce a trouble detect signal even if the above-mentioned no-match detect signal is produced even when the handle is operated at certain positions. The interlock produces the verification signal. If the above-mentioned no-match signal is produced while this verification signal is produced, the evaluator produces a trouble detect signal.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
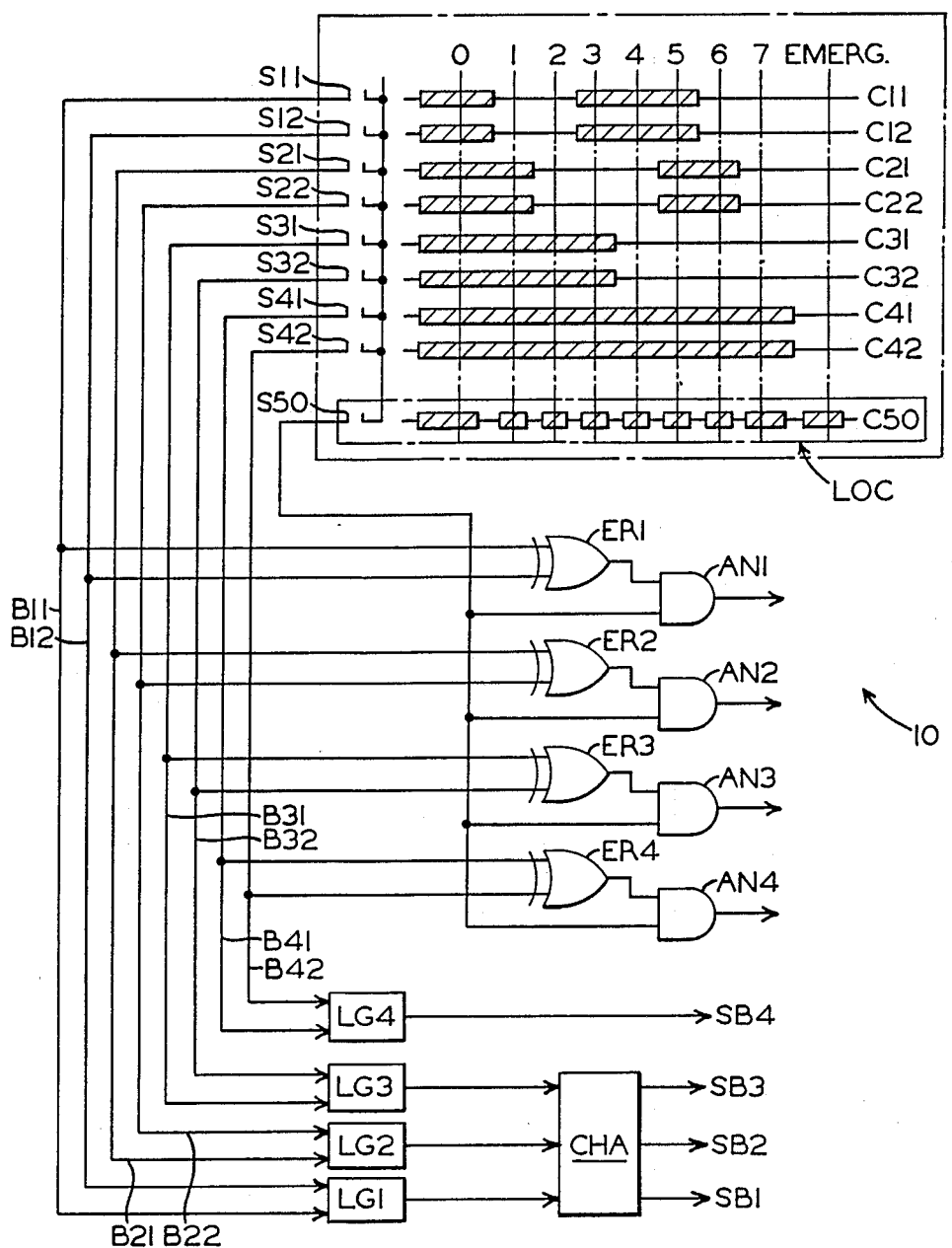
FIG. 1 is a schematic circuit diagram of a duplex brake command system which is a preferred embodiment of the present invention.

Referring now to the drawings, and in particular to FIG. 1, there is shown a brake command system generally characterized by numeral 10. In this preferred embodiment, the command system is a continuous excitation brake command system, and the entire normal brake command system and the emergency brake command system take the form of duplex systems, such as the security brake system, is omitted for the purpose of convenience.

Figure 2:
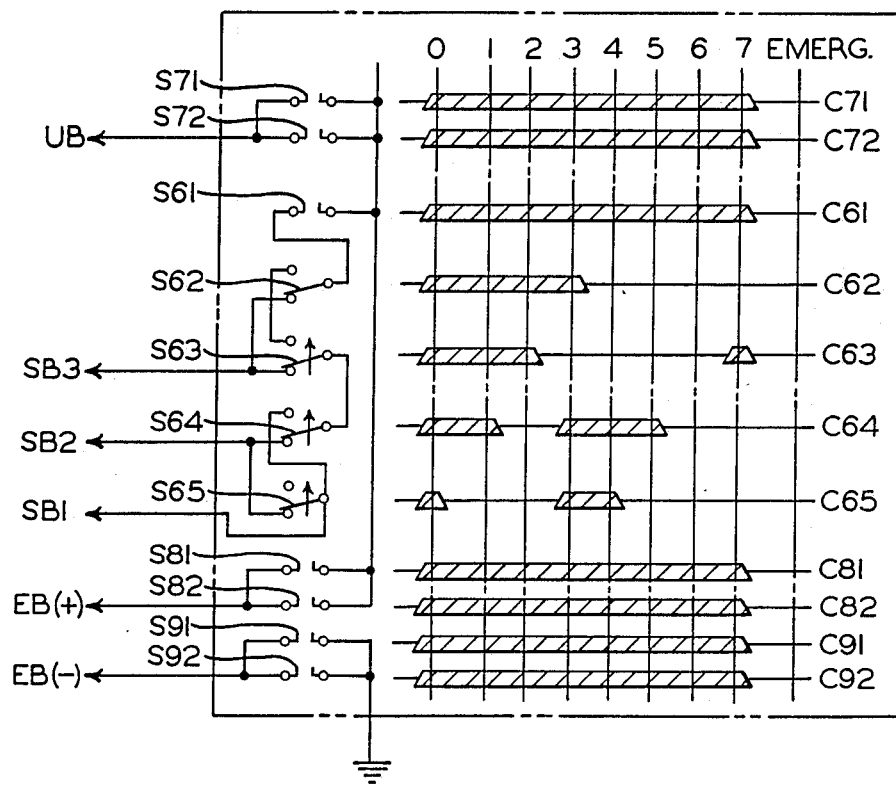
FIG. 2 is a schematic circuit diagram of a simplex brake command system of the prior art type.

In viewing FIG. 1, it will be seen that the brake drum controller has nine (9) rotating cam plates characterized by symbols C11, C12, C21, C22, C31, C32, C41, C42, and C50 which are connected or linked to an appropriate movable handle (not shown). The rotating cam plates cooperate with nine (9) cam switches, represented by characters S11, S12, S21, S22, S31, S32, S41, S42, and S50. The cam switches are turned ON or OFF by the cam plates. The cross-hatched area shown in FIG. 2 is the position where the corresponding cam switch is ON. The cam plates C11, C21, and C31, and the corresponding cam switches, S11, S21, and S31 comprise the first normal brake command system, while the cam plates C12, C22, and C32, and the corresponding cam switches S12, S22, and S32 comprise the second normal brake command system. In addition, the cam plate C41 and the cam switch S41 comprise the first emergency brake command system, while cam plate C42 and cam switch S42 comprise the second emergency brake command system. In addition, cam plate C50 and cam switch S50 form the interlock LOC. The cam switch S50 is turned ON when it engages the cross-hatched sections to produce a verification signal (1). During the portions between the cross-hatched areas at the time each command switch is operated by the rotatable handle, the cam switch S50 is turned OFF so that the output is (0).

In viewing FIG. 1, it will be seen that a plurality of the comparators or comparing circuits ER1, ER2, ER3, and ER4 each takes the form of an EXCLUSIVE-OR circuit. Now when the inputs to a comparator circuit take the form of (0,0) or (1,1), the output is (0), and when the inputs to a given comparator take the form of (1,0) or (0,1), the output is (1). The output (1) is representative of a no-match detect signal. As shown, the input terminals of comparator ER1 are connected to the cam switches S11 and S12, respectively. The input terminals of comparator ER1 are connected to the cam switches S21 and S22, respectively. The input terminals of comparator ER3 are shown connected to the cam switches S31 and S32, respectively, and the input terminals of comparator ER4 are connected to the cam switches S41 and S42, respectively. The evaluators or evaluating circuits AN1, AN2, AN3, and AN4 take the form of AND gates or circuits. Thus, the evaluating circuits produce an output (0) when the input is (0,0), (0,1), or (1,0), and produce an output (1) when the input is (1,1). The output (1), is representative of a trouble detect signal. As shown, one input terminal of each of the evaluators AN1-AN4 is connected to the respective output terminal of each corresponding comparator ER1-ER4 while the other input terminals are connected to the cam switch S50 of the above-mentioned interlock circuit LOC. If all of the cam switches are normal, the interlock circuit LOC produces a verificatin signal of (1) at certain select handle positions, namely 0-7 and emergency. However, since the outputs from the comparators ER1-ER4 are (0), all of the outputs from the evaluators AN1-AN4 are (0). Thus, the trouble detect signal is not developed. In addition, during each command switching time, when the position is changed by operating the handle, the comparator ER1-ER4 produce a no-match detect signal (1), due to the switch time lag in the two cam switches between the first and second systems. However, since cam switch S50 is turned OFF, it is not producing a verification signal (1) at this time period. Thus, every output from the evaluators AN1-AN4 is (0), and the trouble detect signal is not developed. When trouble occurs in some system, such as when cam switch S11 remains OFF and does not turn ON, which represents an open circuit problem condition, the evaluator AN1 produces a trouble detect signal (1) in the release position as well as in 3-5 notch normal brake positions.

When cam switch S42 remains ON and does not shut OFF, it is significant of a closed circuit problem. Under this condition, the evaluator AN4 produces a trouble detect signal (1) in the emergency brake position. These trouble detect signals (1) may take the form of lights on the display monitor and/or buzzers in the operator's cab.

As shown in FIG. 1, the characters B11, B12, B21, B22, B31, and B32 are the command lines for the normal brake system and characters B41 and B42 are the command lines for the emergency brake system. In addition, characters LG1, LG2, LG3, and LG4 represent fail-safe AND or OR logic circuits which produce the correct command from the commands of the first and second systems. Also, the character CHA represents a converter circuit which converts the digital signal of the reflected code into a pure binary code. However, if necessary, it may be eliminated. The characters SB1, SB2, and SB3 represent the poles connecting lines for the normal brake while the character SB4 is the pole connecting line for the emergency brake. Although the interlock circuit LOC is a simplex system in the above-mentioned embodiment, it may be a duplex system like the brake command syste, in which case, it is a fail-safe system with an OR or AND circuit, and the verification signal from one of the systems may be employed.

In addition, in the above-mentioned embodiment, each command system is a duplex system; however, this invention can use other types of multiplex systems. In addition, each command can be continuously monitored and even if the command is not the one from the cam plate and the cam switch but the one from a reflection plate. The light-locking plate and the light switch is still acceptable, and even if each command is not a brake command but a start command, this invention is still operable. In addition, the interlock circuit, the comparator circuit, and the evaluator circuit may utilize either positive or negative logic.

With the invention described above, when each command is switched by manipulating an operating handle, the verification signal will not be produced, even if the comparator detects a no-match signal because of the switching time delay for each command. Thus, the evaluator will not produce a trouble detect signal so that false detection is eliminated. However, the verification signal will be produced in certain command positions with the exception during switch commands so that the trouble detection capability for each command system is accurately maintained.

The following is a list of the components shown in FIG. 2:

LOC—interlock circuit
ER1, ER2, ER3, ER4—comparator circuits
AN1, AN2, AN3, AN4—evaluator circuits
C11, C12, C21, C22, C31, C41, C42, C50—cam plates
S11, S12, S21, S22, S31, S41, S42, S50—cam switches
REL—0, 1, 2, 3, 4, 5, 6, 7, EMER—handle positions
B11, B12, B21, B22, B31, B32, B41, B42—connecting lines
LG1, LG2, LG3, LG4—logic circuits
CHA—converter circuit
SB1, SB2, SB3, SB4—connecting lines Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed.

It will be understood that variations, modifications, equivalents and substitutions for components of the above specifically-described embodiment of the invention may be made by those skilled in the art without departing from the spirit and scope of the invention as set forth in the appended claims.

I claim:

1. A control command system for railway vehicles comprising, a comparator for detecting that a pair of multiplex command signals are matched a handle for manually switching the command signals, an interlock for producing a verification signal at certain handle positions except when the command signals are being switched manually, and an evaluator which produces a trouble detection signal when both an unmatched detect signal from the comparator and the verification signal from the interlock appear in the control command system.

2. The control command system as defined in claim 1, wherein a drum controller including cam plates and switches establish said certain handle positions.

3. The control command system as defined in claim 1, wherein said interlock includes a cam and a cam switch.

4. The control command system as defined in claim 1, wherein said comparator includes a plurality of EXCLUSIVE-OR circuits.

5. The control command system as defined in claim 1, wherein said evaluator includes a plurality of AND gates.

6. The control command system as defined in claim 1, wherein said multiplex command signals are conveyed over a duplex system.

* * * * *